(12) United States Patent
Sun et al.

(10) Patent No.: US 11,709,927 B2
(45) Date of Patent: Jul. 25, 2023

(54) CONSUMABLE CHIP AND COMMUNICATION METHOD FOR CONSUMABLE CHIP

(71) Applicant: Hangzhou Chipjet Technology Co., Ltd., Hangzhou (CN)

(72) Inventors: Yun Sun, Hangzhou (CN); Tianxiang Liu, Hangzhou (CN); Weixin Guo, Hangzhou (CN)

(73) Assignee: Hangzhou Chipjet Technology Co., Ltd., Hangzou (CN)

( * ) Notice: Subject to any disclaimer, the term of this patent is extended or adjusted under 35 U.S.C. 154(b) by 157 days.

(21) Appl. No.: 17/287,505

(22) PCT Filed: Jan. 13, 2020

(86) PCT No.: PCT/CN2020/071637
§ 371 (c)(1),
(2) Date: Apr. 21, 2021

(87) PCT Pub. No.: WO2020/151509
PCT Pub. Date: Jul. 30, 2020

(65) Prior Publication Data
US 2021/0390169 A1    Dec. 16, 2021

(30) Foreign Application Priority Data
Jan. 22, 2019    (CN) .......................... 201910057851.2

(51) Int. Cl.
*G06F 21/44*    (2013.01)
*G06F 21/60*    (2013.01)
(Continued)

(52) U.S. Cl.
CPC ............ *G06F 21/44* (2013.01); *G06F 3/1222* (2013.01); *G06F 3/1238* (2013.01);
(Continued)

(58) Field of Classification Search
None
See application file for complete search history.

(56) References Cited

FOREIGN PATENT DOCUMENTS

| CN | 104097401 A | * | 10/2014 |
| CN | 112644180 A | * | 4/2021 |

OTHER PUBLICATIONS

English translation of CN-104097401-A. (Year: 2014).*
(Continued)

*Primary Examiner* — Thomas D Lee
(74) *Attorney, Agent, or Firm* — Olive Law Group, PLLC

(57) ABSTRACT

Provided is a consumable chip and a communication method thereof. The method is adopted for a consumable chip including a first consumable MCU unit, a verification cryptographic operation unit and a second consumable MCU unit; the method includes: when the first consumable MCU unit is incompatible with the printer, the first consumable MCU unit activating the second consumable MCU unit to execute a second consumable chip core processing flow, and calling the verification cryptographic algorithm function program of the verification cryptographic operation unit to calculate a new verification password; after the first consumable MCU unit inquires that the second consumable MCU unit has completed the second consumable chip core processing flow, the first consumable MCU unit reading the new verification password and sending to the printer, the new verification password is received by the printer to achieve compatibility between the first consumable MCU unit and the printer.

20 Claims, 6 Drawing Sheets

(51) Int. Cl.
*G06F 21/45* (2013.01)
*G06F 3/12* (2006.01)
*G06F 8/41* (2018.01)

(52) U.S. Cl.
CPC ............ *G06F 3/1279* (2013.01); *G06F 8/433* (2013.01); *G06F 21/45* (2013.01); *G06F 21/602* (2013.01)

(56) References Cited

OTHER PUBLICATIONS

English translation of CN-112644180-A. (Year: 2021).*
International Search Report for PCT/CN2020/071637.
Written Opinion for PCT/CN2020/071637.

* cited by examiner

CONSUMABLE CHIP AND COMMUNICATION METHOD FOR CONSUMABLE CHIP

CROSS REFERENCE TO RELATED APPLICATIONS

This is a national phase application of PCT Application No. PCT/CN2020/071637, filed Jan. 13, 2020, which claims priority to Chinese Patent Application No. 2019100578512, filed Jan. 22, 2019, the contents of which are incorporated herein by reference in their entireties.

TECHNICAL FIELD

The present disclosure relates to the technical field of chip communication, and in particular, to a consumable chip and a communication method thereof.

BACKGROUND

At present, consumables generally use chips as the media for information and usage of the consumables. The ciphertext data of the verification cryptographic algorithm between the consumable chip and the printer is stored in the non-volatile storage unit of the consumable chip. When the printer is turned on, the printer will send the index byte and key of the verification cryptographic algorithm to the consumable chip. After the consumable chip receives the index byte and the key, it decrypts the ciphertext data of the verification cryptographic algorithm into the plaintext code according to the index byte and the key, and the MCU core runs the plaintext code of the verification cryptographic algorithm, to calculate and modify the verification password between the consumable chip and the printer.

However, the MCU core of compatible consumables cannot run the plaintext code of the decrypted verification cryptographic algorithm. Therefore, the general consumables can only support the decrypted verification cryptographic algorithm. For the newly decrypted verification cryptographic algorithm after the printer firmware is upgraded, the general consumables cannot support, resulting in poor product resistance to upgrade.

The patent application CN106626792A discloses a certification method for a chip, a system, a printer, a consumable chip, and a consumable box, and specifically discloses a chip certification method. The method is executed on the printer, and includes: sending certification instructions to the consumable chip, the certification instructions include a designated code, the designated code is compiled according to the program compilation format of the certified consumable chip; receiving the running result returned by the consumable chip after running according to the certification instruction; determining whether the consumable chip is a certified consumable chip according to the running result. The consumable chip used in that application is a single core, and is used to solve the problem of security loopholes in the printer's certification method for the consumable chip in the prior art, but fails to solve the problem of poor upgrade resistance of the consumable chip.

SUMMARY

Aiming at the problems in the prior art, the present disclosure provides a consumable chip and a consumable chip communication method that solves the problem of poor upgrade resistance of the consumable chip.

Technical Solutions

The present disclosure is performed through the following technical solutions:

The present disclosure provides a consumable chip, including a first consumable MCU unit, a second consumable MCU unit, and a verification cryptographic operation unit;

when the first consumable MCU unit is incompatible with a printer, the first consumable MCU unit activates the second consumable MCU unit to execute a second consumable chip core processing flow; the second consumable MCU unit executes a verification cryptographic algorithm function program of the verification cryptographic operation unit, and stores a calculated new verification password in the verification cryptographic operation unit;

after the first consumable MCU unit inquires that the second consumable MCU unit has completed the second consumable chip core processing flow, the first consumable MCU unit reads the new verification password of the verification cryptographic operation unit and sending to the printer; the new verification password is received by the printer to make the first consumable MCU unit compatible with the printer.

In a preferred embodiment, the verification cryptographic operation unit includes:

an algorithm code storage subunit configured for storing a plaintext data of a verification algorithm after decryption;

a data storage subunit configured for storing the new verification password and a former verification password;

the second consumable MCU unit executes the verification cryptographic algorithm function program of the algorithm code storage subunit according to the plaintext data of the verification algorithm, and the calculated new verification password is stored in the data storage subunit.

In a preferred embodiment, the consumable chip further includes: a storage unit for storing ciphertext data of the verification algorithm; after the first consumable MCU unit receives an index byte and a key, the first consumable MCU unit searches the ciphertext data of the verification algorithm through the index byte, and decrypts the ciphertext data of the verification algorithm according to the key and then sends the plaintext data of the verification algorithm to the verification cryptographic operation unit; the second consumable MCU unit executes the verification cryptographic algorithm function program according to the plaintext data of the verification algorithm.

In a preferred embodiment, the consumable chip further includes:

a startup code storage unit;

a storage unit for storing a startup code;

before the first consumable MCU unit activates the second consumable MCU unit, the startup code of the storage unit is copied to the startup code storage unit after the consumable chip is powered on.

In a preferred embodiment, the first consumable MCU unit includes:

an execute subunit configured to interact with the printer; when the first consumable MCU unit is incompatible with the printer, the second consumable MCU unit is activated; and a detect subunit configured to determine that the second consumable MCU unit has completed the second consumable chip core processing flow, when a completion mark of the second consumable chip core processing flow completed by the second consumable MCU unit is inquired;

after the detect subunit inquires that the second consumable MCU unit has completed the second consumable chip core processing flow, the execute subunit also configured to read the new verification password of the verification cryptographic operation unit and deactivate the second consumable MCU unit, and then send the new verification password to the printer.

In a preferred embodiment, the first consumable MCU unit further includes a mark clear subunit, configured, before the execute subunit activates the second consumable MCU unit, to clear the completion mark when the second consumable chip core processing flow is previously completed by a second consumable MCU unit.

In a preferred embodiment, the first consumable MCU unit further includes a judge subunit, configured to determine whether the index byte corresponds to a mark value of a first-generation chip; and if so, the second consumable MCU unit is deactivated, the first consumable MCU unit is compatible with the printer;

otherwise, the execute subunit activates the second consumable MCU unit.

In a preferred embodiment, the consumable chip further includes:

a storage unit configured to store the ciphertext data of the verification algorithm, the startup code and the former verification password;

a startup code storage unit;

before the first consumable MCU unit activates the second consumable MCU unit, the startup code of the storage unit is copied to the startup code storage unit after the consumable chip is powered on, and the first consumable MCU unit sends the former verification password to the verification cryptographic operation unit;

after the index byte and the key sent by the printer are received by the first consumable MCU unit, the first consumable MCU unit searches the ciphertext data of the verification algorithm through the index byte, and decrypts the ciphertext data of the verification algorithm according to the key, and sends the plaintext data of the verification algorithm to the verification cryptographic operation unit; the second consumable MCU unit executes the verification cryptographic algorithm function program according to the plaintext data of the verification algorithm.

A communication method for a consumable chip is provided to be used for a consumable chip, the consumable chip includes a first consumable MCU unit, a verification cryptographic operation unit and a second consumable MCU unit; the method includes:

activating, by the first consumable MCU unit, the second consumable MCU unit to execute a second consumable chip core processing flow, when the first consumable MCU unit is incompatible with a printer; and calling the verification cryptographic algorithm function program of the verification cryptographic operation unit to calculate a new verification password;

reading, by the first consumable MCU unit, the new verification password of the verification cryptographic operation unit, and sending to the printer, after the first consumable MCU unit inquires that the second consumable MCU unit has completed the second consumable chip core processing flow; the new verification password is received by the printer to make the first consumable MCU unit compatible with the printer.

In a preferred embodiment, the consumable chip further includes a storage unit; the method further includes:

searching, by the first consumable MCU unit, the ciphertext data of the verification algorithm in the storage unit through an index byte after the first consumable MCU unit receives the index byte and a key sent by the printer, before the first consumable MCU unit activates the second consumable MCU unit, and decrypting the ciphertext data of the verification algorithm according to the key and sending the plaintext data of the verification algorithm to the verification cryptographic operation unit;

executing, by the second consumable MCU unit, the verification cryptographic algorithm function program of the verification cryptographic operation unit according to the plaintext data of the verification algorithm, and calculating a new verification password.

In a preferred embodiment, the consumable chip further includes a startup code storage unit and a storage unit; and the method further includes:

copying, by the first consumable MCU unit, the startup code of the storage unit to the startup code storage unit after the consumable chip is powered on, before the first consumable MCU unit activates the second consumable MCU unit;

calling the startup code storage unit after the second consumable MCU unit is activated.

In a preferred embodiment, the method further includes:

determining that the second consumable MCU unit has completed the second consumable chip core processing flow, when the first consumable MCU unit inquires a completion mark that the second consumable MCU unit has completed the second consumable chip core processing flow, and deactivating, by the first consumable MCU unit, the second consumable MCU unit after the new verification password is read.

In a preferred embodiment, the method further includes:

clearing the completion mark that a second consumable MCU unit previously completes the second consumable chip core processing flow, before the first consumable MCU unit activates the second consumable MCU unit.

In a preferred embodiment, the method further includes:

determining, by the first consumable MCU unit, whether the index byte is corresponding to a mark value of a first-generation chip before the ciphertext data of the verification algorithm is searched by the index byte;

if so, the second consumable MCU unit being not activated, and the first consumable MCU unit being compatible with the printer;

otherwise, the second consumable MCU unit being activated.

In a preferred embodiment, the consumable chip further includes a storage unit and a startup code storage unit; the method further includes:

copying, by the first consumable MCU unit, the startup code of the storage unit to the startup code storage unit after the consumable chip is powered on, before the first consumable MCU unit activates the second consumable MCU unit, and sending the former verification password of the storage unit to the verification cryptographic operation unit;

searching, by the first consumable MCU unit, the ciphertext data of the verification algorithm through the index byte, and decrypting the ciphertext data of the verification algorithm according to the key and sending the plaintext data of the verification algorithm to the verification cryptographic operation unit, after receiving the index byte and the key sent by the printer;

executing, by the second consumable MCU unit, the verification cryptographic algorithm function program of the verification cryptographic operation unit according to the plaintext data of the verification algorithm, and calculating a new verification password.

In a preferred embodiment, the steps of the second consumable MCU unit executing the second consumable chip core processing flow are specifically:

the second consumable MCU unit jumping to the startup code storage unit to run the startup code according to a reset address;

the second consumable MCU unit closing all interrupts;

the second consumable MCU unit calling the verification cryptographic algorithm function program in the algorithm code storage subunit, and running after jumping to the algorithm code storage subunit;

the second consumable MCU unit running the verification cryptographic algorithm function program in the algorithm code storage subunit, and running after jumping to the startup code storage subunit;

the second consumable MCU unit setting the completion mark for the second consumable MCU unit to complete the second consumable chip core processing flow, and then entering a wait.

Beneficial Effect

The present disclosure provides a consumable chip and a communication method for the consumable chip, it can solve the problem of poor upgrade resistance of the consumable chip, and improve the compatibility between the consumable chip and the printer.

DETAILED DESCRIPTION OF EMBODIMENTS

The following are specific embodiments of the present disclosure in combination with the accompanying drawings to further describe the technical solutions of the present disclosure, but the present disclosure is not limited to these embodiments.

Since the existing single-core consumable chip cannot be applied after the printer firmware is upgraded, it cannot be certified with the printer, and normal communication interaction cannot be realized. To this end, the present disclosure adds a consumable chip core on the basis of the existing consumable chip, and corresponding units, data information, etc. that interact with the two consumable chip cores. That is to say, the consumable chip of the present disclosure is a dual-core chip, and the dual-core consumable chip is used to solve certification and communication between the consumable chip and the printer in different situations, including the printer firmware not upgraded and the printer firmware upgrade.

Figure 1:
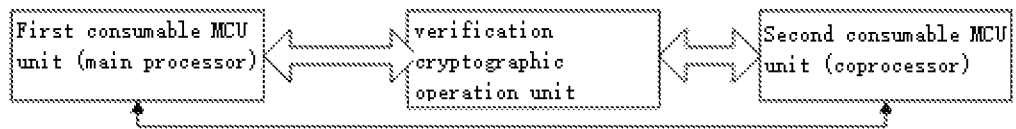
FIG. 1 is a structural block diagram showing a consumable chip according to the present disclosure.

As shown in FIG. 1, the present disclosure provides a consumable chip including a first consumable MCU unit, a second consumable MCU unit, and a verification cryptographic operation unit. When the first consumable MCU unit is not compatible with the printer, the first consumable MCU unit activates the second consumable MCU unit to execute the second consumable chip core processing flow; otherwise, it does not activate. The second consumable MCU unit executes the verification cryptographic algorithm function program of the verification cryptographic operation unit, and stores the calculated new verification password in the verification cryptographic operation unit. After the first consumable MCU unit inquires that the second consumable MCU unit has completed the second consumable chip core processing flow, the first consumable MCU unit reads the new verification password of the verification cryptographic operation unit and sends it to the printer. The new verification password can be received by the printer to realize compatibility between the first consumable MCU unit and the printer.

In other words, the first consumable MCU unit can be the main processor of the consumable chip according to the present disclosure, it can be an ARM core or an MSP430 core. The first consumable MCU unit is in charge of processing printer command data, including receiving commands and data sent by the printer, such as on-machine certification commands. The second consumable MCU unit can be the coprocessor of the consumable chip according to the present disclosure, it can be an ST23 core, and can be in charge of executing the verification cryptographic algorithm function program of the verification cryptographic operation unit. For example, the first consumable MCU unit can be a general consumable MCU unit, and the second consumable MCU unit can be an original consumable MCU unit. When the first consumable MCU unit can have the printer certification to communicate with it, only the single core of the consumable chip is needed, that is, the first consumable MCU unit works, and the second consumable MCU unit does not need to be activated. When the first consumable MCU unit cannot pass the certification of the printer or fails to be compatible with the communication, the dual core of the consumable chip needs to be activated, with the first consumable MCU unit as the main one and the second consumable MCU unit as the auxiliary. During certification, the second consumable MCU unit can be activated to perform a calculation for a new verification password of the verification cryptographic operation unit, such that the certification of the printer can be obtained.

Specifically, the verification cryptographic operation unit includes an algorithm code storage subunit and a data storage subunit. The algorithm code storage subunit can be used to store the plaintext data of the verification algorithm after decryption. The data storage subunit can be used to store the new verification password and the former verification password. The second consumable MCU unit executes the verification cryptographic algorithm function program of the algorithm code storage subunit according to the plaintext data of the verification algorithm, and the calculated new verification password can be stored in the data storage subunit.

Wherein, the second consumable MCU unit executes the verification cryptographic algorithm function program of the verification cryptographic operation unit based on the plaintext data of the verification algorithm. In an embodiment, the plaintext data of the verification algorithm can be calculated after the second consumable MCU unit is activated. The first consumable MCU unit can obtain the index byte and key through the printer and send them to the second consumable MCU unit. The second consumable MCU unit queries the ciphertext data of the verification algorithm according to the index byte, and uses the key to decrypt into the plaintext data of the verification algorithm, and the plaintext data of the verification algorithm can be stored in the verification cryptographic operation unit. In another embodiment, the plaintext data of the verification algorithm can be obtained through calculated by the first consumable MCU unit and then sent to the second consumable MCU unit, and can be stored in the verification cryptographic operation unit. In the above two embodiments, the consumable chip further includes a storage unit for storing ciphertext data of the verification algorithm. Taking the latter embodiment as an example, specifically, after the first consumable MCU unit receives the index byte and the key sent by the printer, it searches the ciphertext data of the verification algorithm through the index byte, and decrypts the ciphertext data of the verification algorithm according to the key, and then sends the plaintext data of the verification algorithm to the verification cryptographic operation unit. The second consumable MCU unit executes the verification cryptographic algorithm function program according to the plaintext data of verification algorithm. The storage unit can be a volatile storage unit or a non-volatile storage unit, and the storage unit can be not limited to one, and more than one storage units can be provided.

In one embodiment, the second consumable MCU unit executes the startup program by default setting the startup code in the second consumable MCU unit. Once the second consumable MCU unit receives the startup instruction sent by the first consumable MCU, then it runs automatically according to the startup code. In another embodiment, the startup code can be provided by the first consumable MCU unit, and when the startup code is sent to the second consumable MCU unit, once the second consumable MCU unit receives the startup instruction sent by the first consumable MCU, it runs according to the sent startup code. In the latter embodiment, the consumable chip further includes a startup code storage unit and a storage unit. The storage unit can be configured to store the startup code. Before the first consumable MCU unit activates the second consumable MCU unit, the startup code of the storage unit can be copied to the startup code storage unit after the consumable chip is powered on. The storage unit can be a volatile storage unit or a non-volatile storage unit, and the storage unit can be not limited to one, and more than one storage units can be provided.

Wherein, before the new verification password of the verification cryptographic operation unit is generated, the former verification password can be stored in the verification cryptographic operation unit. The former verification password can be the one left over from the previous operation. When the former verification password is prior to the first new verification password operation, it can be pre-stored in the verification cryptographic operation unit as the initial value of the verification password. Or the former verification password can be sent to the verification cryptographic operation unit before the second consumable MCU unit is ready to be activated by the first consumable MCU unit. In the implementation of the former verification password sent by the first consumable MCU unit, the storage unit of the consumable chip also stores the former verification password. Before storing the new verification password in the verification cryptographic operation unit, the first consumable MCU unit sends the former verification password to the verification cryptographic operation unit. The storage unit can be a volatile storage unit or a non-volatile storage unit, and the storage unit can be not limited to one, and more than one storage units can be provided.

Specifically, the first consumable MCU unit includes an execute subunit and a detect subunit. The execute subunit can be configured to interact with the printer, and when the first consumable MCU unit is not compatible with the printer, the second consumable MCU unit can be activated; and after the detect subunit inquires that the second consumable MCU unit has completed the second consumable chip core processing flow, the new verification password of the verification cryptographic operation unit can be read and sent to the printer. The detect subunit can be configured to confirm that the second consumable MCU unit has completed the second consumable chip core processing flow when the completion mark of the second consumable MCU unit completing the second consumable chip core processing flow is inquired. The completion mark can clarify whether the second consumable chip core processing flow is end or not.

The second consumable MCU unit can remain activated after being activated. However, this will cause a great power loss in the subsequent communication and interaction between the first consumable MCU unit and the printer, and reduce the efficiency of communication and interaction between the first consumable MCU unit and the printer. To this end, after the detect subunit detects the completion mark and the execute subunit reads the new verification password, the execute subunit deactivates the second consumable MCU unit, and then sends the new verification password to the printer. Once the second consumable MCU unit has completed the operation of the new verification password, that is, after completing the auxiliary operation when the first consumable MCU unit is incompatible with the printer, the second consumable MCU unit has no meaning to be activated, so it is just deactivated, leaving only the first consumable MCU unit (single core) certifies and communicates with the printer, such that the communication efficiency can be sped up. Moreover, once the second consumable MCU unit is deactivated, the verification cryptographic operation unit also stops working.

In order to ensure that the consumable chip according to the present disclosure can be used for many times without error, the first consumable MCU unit further includes a mark clear subunit. Before the execute subunit activates the second consumable MCU unit, clear the completion mark that the second consumable MCU unit has previously completed the second consumable chip core processing flow. After the second consumable MCU unit is activated for use last time, the mark is non-zero, and it can be clear before activating again. After the second consumable MCU unit is activated and the second chip core processing flow is executed, the mark can change to non-zero. When the first consumable MCU unit detects that the mark is non-zero, the new verification password is read from the data storage subunit, and then the second consumable MCU unit can be deactivated.

The first consumable MCU unit further includes a judge subunit for determining whether the index byte corresponds to the mark value of the first-generation chip; and if yes, the second consumable MCU unit can be deactivated, and the first consumable MCU unit is compatible with the printer; otherwise, the execute subunit activates the second consumable MCU unit. Due to the present of the judge subunit, it can be judged before activating the second consumable MCU unit. When the printer certification and communication can be adapted, there can be no need to activate the second consumable MCU unit to execute the second consumable chip core processing flow, it is sufficient as long as the first consumable MCU unit is used. The verification password stored on the first consumable MCU unit or the new verification password directly calculated by the first consumable MCU unit can be directly sent to the printer to quickly enter the certification and interactive communication. This process can be equivalent to enabling the dual-core or single-core judgment process, which helps the system to optimize operation. For example, assuming that the mark value of the first-generation chip is 0, if the index byte value is equal to 0, the first consumable MCU unit sends the verification password to the printer; if the index byte value is not equal to 0, the dual core is activated and the second consumable MCU unit calculates the new verification password, and the first consumable MCU unit sends the new verification password to the printer. The mark value of the first-generation chip can be not limited to zero, and the mark value of the first-generation chip can be understood not only as the first-generation chip, but also as the general-purpose chip before the printer firmware is upgraded. The latter understands that generally the earlier generation chips have been eliminated and disused for many years and are not produced, then the consumable chips do not need to record the data of the earlier generation chips, such as the former verification password of the earlier generation chips, such that the interaction efficiency between the consumable chips and the printer communication system can be improved.

Whether the first consumable MCU unit is compatible with the printer, in addition to determining whether the index byte corresponds to the mark value of the first-generation chip, other methods can also be adopted. For example, in one embodiment, through the first consumable MCU unit looks up the ciphertext data of the verification algorithm, if the ciphertext data of the verification algorithm after the printer firmware upgrade is not searched, it can be considered incompatible, and the subsequent compatibility certification needs to be performed through the ciphertext data of the verification algorithm stored in the second consumable MCU unit. In another embodiment, the first consumable MCU unit and the printer directly perform existing communication certification. Once the certification fails, it is incompatible. At this time, the second consumable MCU unit replaces the first consumable MCU unit for subsequent certification communication.

Figure 2:
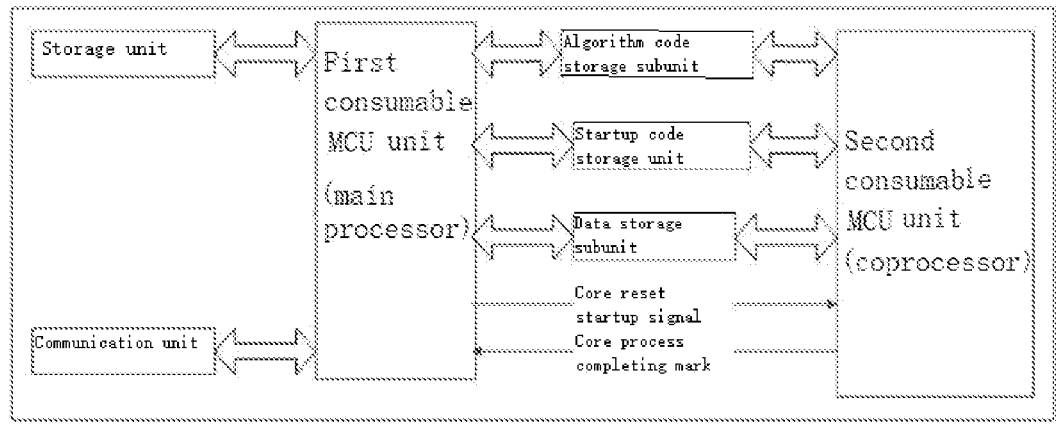
FIG. 2 is a structural block diagram showing a first consumable MCU unit in a consumable chip according to the present disclosure.

FIG. 2 shows a specific implementation of a consumable chip according to the present disclosure, including a first consumable MCU unit, a storage unit, a verification cryptographic operation unit (including an algorithm code storage subunit and a data storage subunit), a startup code storage unit, a second consumable MCU unit, and a communication unit.

Before the first consumable MCU unit activates the second consumable MCU unit, the storage unit copies the startup code to the startup code storage unit after the consumable chip is powered on, and the first consumable MCU unit sends the former password to the verification cryptographic operation unit. In other words, when it is determined that the first consumable MCU unit is incompatible with the printer and the second consumable MCU unit is ready to be activated, and before the second consumable MCU unit is activated, the parameters needed by the verification cryptographic operation unit and the second consumable MCU unit can be sent to the corresponding location. Once the second consumable MCU unit is activated, it can immediately execute the startup program and calculate the new verification password.

After receiving the index byte and the key sent by the printer, the first consumable MCU unit searches the ciphertext data of the verification algorithm through the index byte, and decrypts it according to the key and sends the plaintext data of the verification algorithm after decryption to the verification cryptographic operation unit. The second consumable MCU unit executes the verification cryptographic algorithm function program according to the plaintext data of the verification algorithm.

The storage unit can be a non-volatile storage unit or a volatile storage unit. The storage unit can be not limited to one, and more than one can be provided. The non-volatile storage unit can be FLASH or EEPROM, configured to store consumable software programs, ciphertext data of the verification algorithm, and startup codes such as BOOT codes. The volatile storage unit can be SRAM, configured to store temporary data generated when the first consumable MCU unit and the communication unit are running. The storage unit can be also used to store the former verification password. When the printer firmware is not upgraded, the former verification password can be used for certification between the consumable chip and the printer.

The communication unit can be an $I^{2C}$ communication module or a single-wire communication module, which is in charge of sending and receiving printer command data.

The first consumable MCU unit can be the main processor of the consumable chip according to the present disclosure. The first consumable MCU unit is in charge of processing printer command data, including receiving commands and data sent by the printer, such as on-machine certification commands. The first consumable MCU unit can decrypt the ciphertext data of the verification algorithm in the storage unit, and write the decrypted plaintext data of the verification algorithm into the algorithm code storage subunit. The first consumable MCU unit also writes the startup code stored in the storage unit into the startup code storage unit. The first consumable MCU unit also performs read and write processing on the data storage subunit. The first consumable MCU unit can also activate/stop the second consumable MCU unit.

The startup code storage unit can be a startup code RAM unit, such as a BOOT code RAM unit, such as SRAM, used to store the startup code of the second consumable MCU unit.

The second consumable MCU unit can be the coprocessor of the consumable chip according to the present disclosure, configured for in charge of executing the programs of the startup code storage unit and the verification cryptographic operation unit, and storing the new verification password obtained by calculation in the verification cryptographic operation unit. The verification cryptographic operation unit includes an algorithm code storage subunit and a data storage subunit. The algorithm code storage subunit can be an algorithm code RAM unit, such as SRAM, for storing the plaintext data of the verification algorithm after decryption. The data storage subunit can be a data RAM unit, such as SRAM, for storing the new verification password and the former verification password. When the new verification password is stored, it will overwrite the former verification password stored. Alternatively, after the new verification password is stored, the former and new verification passwords coexist, and the new verification password is the first option for calling.

After the consumable chip is powered on, the first consumable MCU unit calls and runs the consumable software program. First, it copies the startup code in the storage unit to the startup code storage unit, and then wait for the printer to send commands and data.

After the consumable chip receives the index byte and the key sent by the printer, the first consumable MCU unit first searches the corresponding ciphertext data of the verification algorithm in the storage unit according to the index byte. Wherein, the ciphertext data of the verification algorithm can be stored in the form of a ciphertext data of the verification algorithm table, and a number of ciphertext data of the verification algorithm identified by index bytes can be stored. Specifically, the ciphertext data of the verification algorithm table can be queried according to the index byte to obtain the corresponding ciphertext data of the verification algorithm. Then, the first consumable MCU unit decrypts the ciphertext data of the verification algorithm into plaintext data of the verification algorithm according to the key, and writes the plaintext data of the verification algorithm into the algorithm code storage subunit, and then writes the former verification password into the data storage subunit, and finally activate the second consumable MCU unit. The first consumable MCU unit queries that the second consumable MCU unit has completed the second consumable chip core processing flow after activation, read the new verification password in the data storage subunit, and send the new verification password to the printer after deactivating the second consumable MCU unit. The consumable software program includes the software program of the first consumable MCU unit, and the process completed by the first consumable MCU unit is a part of the software program of the first consumable MCU unit (see FIG. 6).

Figure 3:
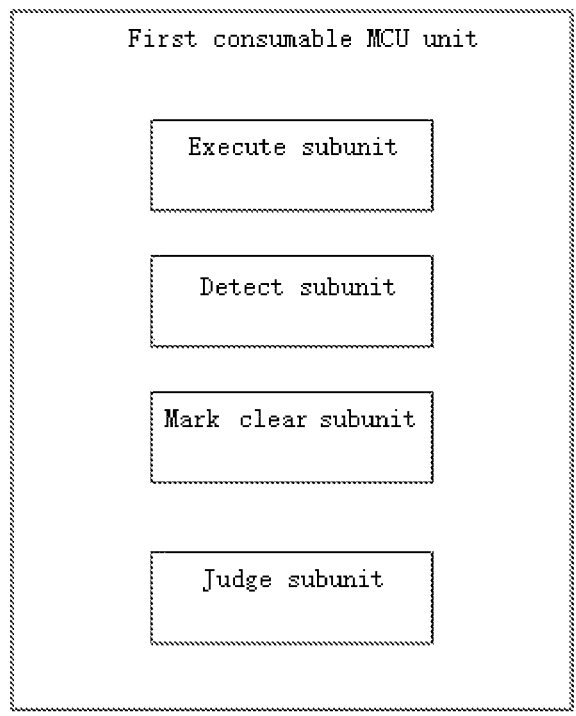
FIG. 3 is a structural block diagram showing a consumable chip according to an embodiment of the present disclosure.

As shown in FIG. 3, the first consumable MCU unit includes an execute subunit and a detect subunit. The execute subunit can be used to copy the startup code, decrypt the ciphertext data of the verification algorithm, and activate the second consumable MCU unit after sending the plaintext data of the verification algorithm to the algorithm code storage subunit and the former verification password to the data storage subunit. After the detect subunit queries that the second consumable MCU unit has completed the second consumable chip core processing flow, the execute subunit deactivates the second consumable MCU unit, and send the new verification password to the printer. The detect subunit can be configured to confirm that the second consumable MCU unit completes the second consumable chip core processing flow, when the completion mark that the second consumable MCU unit has completed the second consumable chip core processing flow is queried. After that, the execute subunit reads the new verification password and deactivates the second consumable MCU unit.

In order to avoid query errors, the first consumable MCU unit also includes a mark clear subunit, configured, before the execute subunit activates the second consumable MCU unit, to clear the completion mark when the second consumable chip core processing flow is previously completed by the second consumable MCU unit. After the second consumable MCU unit is activated for use last time, the mark is non-zero, and it can be cleared before activating again. After the second consumable MCU unit activates and the second chip core processing flow is executed, the mark changes to non-zero. When the first consumable MCU unit detects that the mark is non-zero, the new verification password from the data storage subunit can be read, and then the second consumable MCU unit can be deactivated.

In addition, the first consumable MCU unit also includes a judge subunit for determining whether the index byte corresponds to the mark value of the first-generation chip. If so, the second consumable MCU unit can be not activated and the former verification password in the storage unit can be sent to the printer; otherwise, the execute subunit decrypts the ciphertext data of the verification algorithm, and activate the second consumable MCU unit after sending the plaintext data of the verification algorithm to the algorithm code storage subunit and the former verification password to the data storage subunit. After the detect subunit queries that the second consumable MCU unit has completed the second consumable chip core processing flow, the execute subunit deactivates the second consumable MCU unit, and sends a new verification password to the printer. Due to the existence of the judge subunit, it can be determined before activating the second consumable MCU unit. When the printer certification and communication are adapted, there is no need to activate the second consumable MCU unit to execute the second consumable chip core processing flow, as long as the first consumable MCU unit can be used to directly send the former verification password to the printer to quickly enter the certification and interactive communication. This process can be equivalent to enabling the dual-core or single-core judgment process, which helps the system to optimize operation. For example, assuming that the mark value of the first-generation chip is 0, if the index byte value is equal to 0, the first consumable MCU unit sends the former verification password to the printer; if the index byte value is not equal to 0, the dual-core can be activated, and the second consumable MCU unit calculates a new verification password, and the first consumable MCU unit sends the new verification password to the printer. The mark value of the first-generation chip can be not limited to 0, and the mark value of the first-generation chip can not only be understood as the first-generation chip, it can also be understood as a general-purpose chip before the printer firmware is not upgraded. The latter understands that the chips of earlier generations are generally eliminated and disused for many years without production, so that consumable chips do not need to record the data of earlier generation chips, such as the old verification password of earlier generation chips, such that the interaction efficiency between the consumable chips and the printer communication system can be improved.

After the second consumable MCU unit is activated, the second consumable MCU unit executes the second consumable chip core processing flow specifically as follows: the second consumable MCU unit first runs the startup code in the startup code storage unit, and then jumps to the algorithm code storage subunit to run the verification cryptographic algorithm function program. After the verification cryptographic algorithm function program completely run, the new verification password can be written into the data storage subunit, and the second consumable MCU unit jumps back to the startup code storage unit and sets the completion mark of the second consumable chip core processing flow. The consumable software program further includes a software program of the second consumable MCU unit, and the process completed by the second consumable MCU unit can be the software program of the second consumable MCU unit (see FIG. 5).

After the first consumable MCU unit detects the completion mark that the second consumable MCU unit has completed the second consumable chip core processing flow, it first reads the new verification password from the data storage subunit, and then sends the new verification password to the printer. The process completed by the first consumable MCU unit can be also a part of the software program of the first consumable MCU unit (see FIG. 6).

Figure 4:
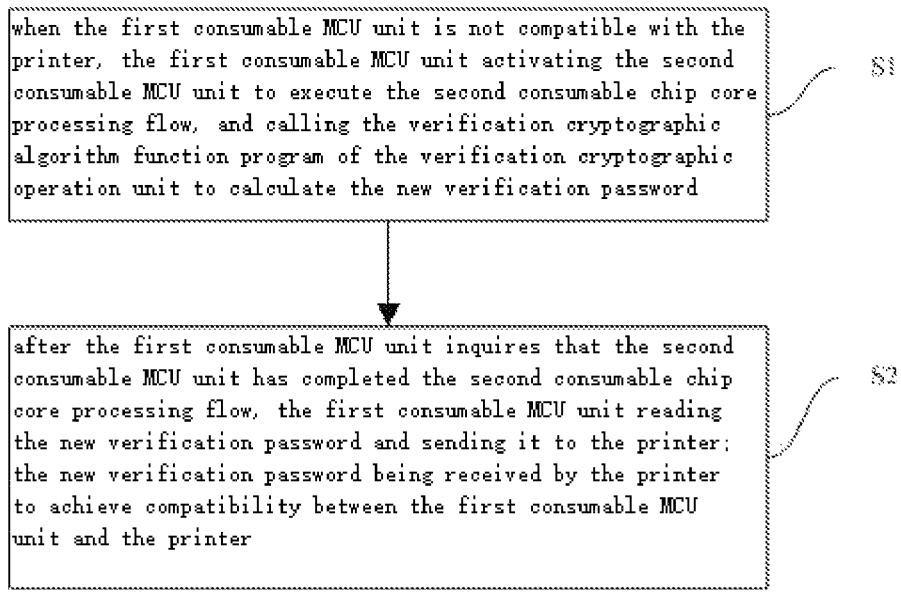
FIG. 4 is a flowchart of a consumable chip communication method applied to a first consumable MCU unit according to the present disclosure.

FIG. 4 shows a communication method for a consumable chip according to the present disclosure, adopted for consumable chips including a first consumable MCU unit, a verification cryptographic operation unit, and a second consumable MCU unit; the method includes:

Step S1: when the first consumable MCU unit is not compatible with the printer, the first consumable MCU unit activating the second consumable MCU unit to execute the second consumable chip core processing flow, and calling the verification cryptographic algorithm function program of the verification cryptographic operation unit to calculate the new verification password. Wherein, when the first consumable MCU unit is compatible with the printer, it is no need to perform Step S2, and the first consumable MCU unit directly performs existing certification and interactive communication with the printer.

Step S2: after the first consumable MCU unit inquires that the second consumable MCU unit has completed the second consumable chip core processing flow, the first consumable MCU unit reading the new verification password and sending it to the printer. The new verification password can be received by the printer to achieve compatibility between the first consumable MCU unit and the printer.

The second consumable MCU unit executes the verification cryptographic algorithm function program of the verification cryptographic operation unit based on the plaintext data of the verification algorithm, and the plaintext data of the verification algorithm can be obtained in the following manner: in one embodiment, the plaintext data of the verification algorithm can be calculated after the second consumable MCU unit is activated. The first consumable MCU unit obtains the index byte and key through the printer and send them to the second consumable MCU unit. The second consumable MCU unit queries the ciphertext data of the verification algorithm according to the index byte, and uses the key to perform decryption into plaintext data of the verification algorithm and store it in the verification cryptographic operation unit. In this manner, the method of the present disclosure further includes the step of obtaining the plaintext data of the verification algorithm. The plaintext data of the verification algorithm can be obtained according to the existing consumable MCU unit and printer certification method, that is, the ciphertext data of the verification algorithm can be decrypted by the key. In another embodiment, the plaintext data of the verification algorithm is obtained by calculated by the first consumable MCU unit, and then the plaintext data of the verification algorithm is sent to the second consumable MCU unit, and stored in the verification cryptographic operation unit. In the above two implementations, the consumable chip further includes a storage unit for storing the plaintext data of the verification algorithm obtained in the above method. Taking the latter embodiment as an example, specifically, the method further includes: before the first consumable MCU unit activates the second consumable MCU unit, the first consumable MCU unit receiving the index byte and the key sent by the printer, then, the ciphertext data of the verification algorithm being searched through the index byte, and being decrypted according to the key and sent to the verification cryptographic operation unit. After obtaining the plaintext data of the verification algorithm, the subsequent steps can be executed as described in S1-S2, that is, after that, the second consumable MCU unit executes the verification cryptographic algorithm function program of the verification cryptographic operation unit according to the plaintext data of the verification algorithm, and calculates the new verification password.

In one embodiment, the second consumable MCU unit executes the startup program by default setting the startup code in the second consumable MCU unit, once the second consumable MCU unit receives the startup instruction sent by the first consumable MCU, then it runs automatically according to the startup code. In another embodiment, the startup code can be provided by the first consumable MCU unit. The consumable chip further includes a startup code storage unit and a storage unit. The method further includes: before the first consumable MCU unit activates the second consumable MCU unit, copying the startup code of the storage unit to the startup code storage unit after the consumable chip is powered on; calling the startup code storage unit after the second consumable MCU unit is activated.

Wherein, before the new verification password of the verification cryptographic operation unit is generated, the former verification password can be stored in the verification cryptographic operation unit. The former verification password can be left over from the previous operation. When the former verification password is the one before the first new verification password operation, it can be pre-stored in the verification cryptographic operation unit as the initial value of the verification password. Or the former verification password can be further sent by the first consumable MCU unit to the verification cryptographic operation unit before the second consumable MCU unit is ready to be activated. In the implementation of the former verification password sent by the first consumable MCU unit, the storage unit of the consumable chip also stores the former verification password. Before the first consumable MCU unit activates the second consumable MCU unit, the first consumable MCU unit sends the former verification password to the verification cryptographic operation unit.

Wherein, the steps of the first consumable MCU unit inquires that the second consumable MCU unit has completed the second consumable chip core processing flow can be specifically: when the first consumable MCU unit inquires the completion mark that the second consumable MCU unit has completed the second consumable chip core processing flow, confirming that the second consumable MCU unit has completed the second consumable chip core processing flow. If the completion mark is not set, it is impossible to clearly and promptly confirm whether the second consumable MCU unit has completed the second consumable chip core processing flow. The completion mark can be an identifier. When it is not completed, the identifier is equal to 0, and when it is completed, the identifier is equal to 1. The completion mark can also be an end parameter or feedback instruction after the program execution ends. When the first consumable MCU unit determines that the feedback instruction or parameter is a predetermined completion mark, it confirms that the second consumable chip core processing flow is completed.

The second consumable MCU unit can remain activated after being activated. However, this will cause a great power loss in the subsequent communication and interaction between the first consumable MCU unit and the printer, and reduce the efficiency of communication and interaction between the first consumable MCU unit and the printer. To this end, the method further includes: after the first consumable MCU unit inquires that the second consumable MCU unit has completed the second consumable chip core processing flow and reads the new verification password, the first consumable MCU unit deactivating the second consumable MCU unit.

In order to ensure that the consumable chip of the present disclosure after being used for many times without errors, before the first consumable MCU unit activates the second consumable MCU unit, the completion mark that the second consumable MCU unit previously completes the second consumable chip core processing flow can be cleared. It can be realized by the above mark clear subunit.

In order to avoid a situation that the first consumable MCU unit activates every time to calculate a new verification password, when determining whether the first consumable MCU unit is compatible with the printer, the method according to the present disclosure further includes: before searching the ciphertext data of the verification algorithm through the index byte, the first consumable MCU unit determining whether the index byte corresponds to the mark value of the first-generation chip; if so, the second consumable MCU unit deactivating, and the first consumable MCU unit being compatible with the printer; otherwise, the second consumable MCU unit being activated. For example, assuming that the mark value of the first-generation chip is 0, if the index byte value is equal to 0, the first consumable MCU unit sends the verification password to the printer; if the index byte value is not equal to 0, the dual core is activated and the second consumable MCU unit calculates the new verification password, and the first consumable MCU unit sends the new verification password to the printer. The mark value of the first-generation chip can be not limited to 0, and the mark value of the first-generation chip can be understood not only as the first-generation chip, but also as the general-purpose chip before the printer firmware is upgraded. The latter understands that the chips of earlier generations are generally eliminated and disused for many years without production, so that consumable chips do not need to record the data of earlier generation chips, such as the old verification password of earlier generation chips, such that the interaction efficiency between consumable chips and the printer communication system can be improved.

Whether the first consumable MCU unit is compatible with the printer, in addition to determining whether the index byte corresponds to the mark value of the first-generation chip, other methods can also be adopted, for example, in one embodiment, through the first consumable MCU unit looking up the ciphertext data of the verification algorithm. If the ciphertext data of the verification algorithm is not searched after the printer firmware upgrades, it is considered incompatible, and the subsequent compatibility certification needs to be performed through the ciphertext data of the verification algorithm stored in the second consumable MCU unit. In another embodiment, the first consumable MCU unit and the printer directly perform existing communication certification. Once the certification fails, it is incompatible. At this time, the second consumable MCU unit replaces the first consumable MCU unit for subsequent certification communication.

Figure 6:
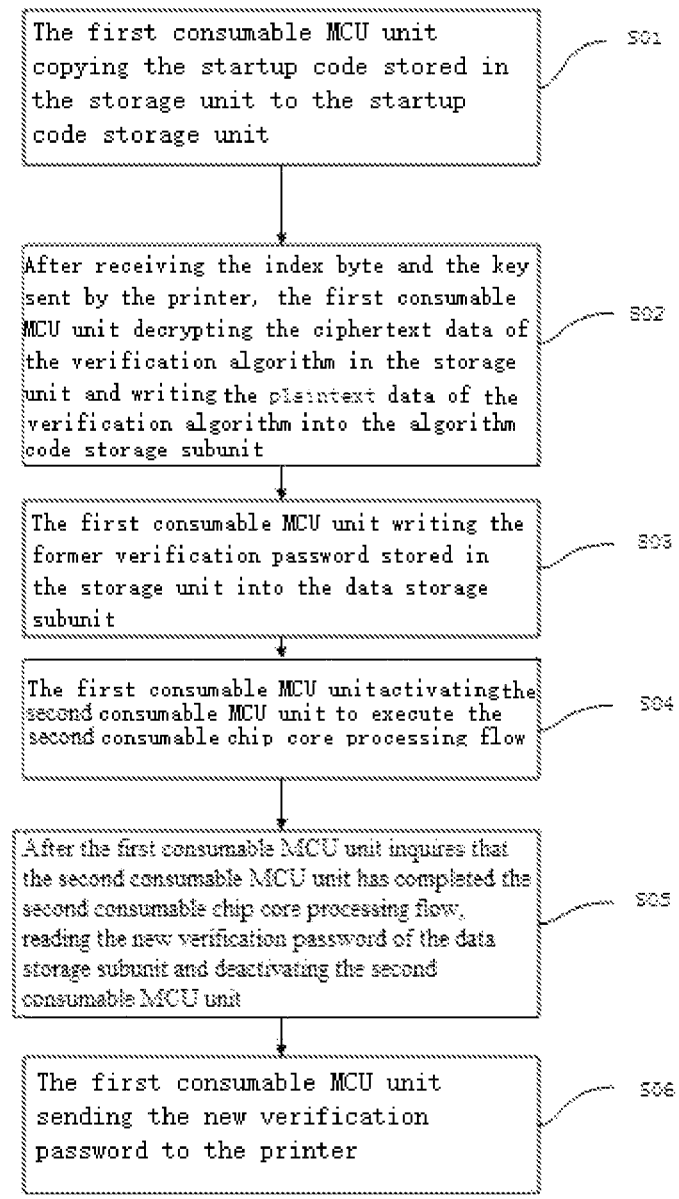
FIG. 6 is a flowchart according to an embodiment of a consumable chip communication method applied to a first consumable MCU unit according to the present disclosure.

FIG. 6 shows a specific implementation of a consumable chip communication method according to the present disclosure. The method is used for consumable chips including a first consumable MCU unit, a storage unit, a startup code storage unit, a verification cryptographic operation unit, and a second consumable MCU unit. The verification cryptographic operation unit includes an algorithm code storage subunit and a data storage subunit. This method specifically depends on the implementation of the consumable chip example shown in FIG. 3.

The method includes:

Step S01, the first consumable MCU unit copying the startup code stored in the storage unit to the startup code storage unit;

Step S02, after receiving the index byte and the key sent by the printer, the first consumable MCU unit decrypting the ciphertext data of the verification algorithm in the storage unit and writing the plaintext data of the verification algorithm into the algorithm code storage subunit;

If the printer has not sent the index byte and key, the first consumable MCU unit will wait for the command until it receives the command, and executes the following steps.

Step S03, the first consumable MCU unit writing the former verification password stored in the storage unit into the data storage subunit;

Step S04, the first consumable MCU unit activating the second consumable MCU unit to execute the second consumable chip core processing flow;

Step S05, after the first consumable MCU unit inquires that the second consumable MCU unit has completed the second consumable chip core processing flow, reading the new verification password of the data storage subunit and deactivating the second consumable MCU unit;

Step S06, the first consumable MCU unit sending the new verification password to the printer;

Wherein, the new verification password of the data storage subunit is obtained in the process of executing the second consumable chip core processing by the second consumable MCU unit, and the second consumable MCU unit executes the verification cryptographic algorithm function program in the algorithm code storage subunit, and writes the calculated new verification password into the data storage subunit.

The method further includes: adding a dual-core or single-core system selection judgment process at Step S02.

After receiving the index byte and key sent by the printer, it is determined whether the index byte corresponds to the mark value of the first generation chip. If yes, the second consumable MCU unit can be not activated, and the first consumable MCU unit sends the former verification password stored in the storage unit to the printer, and the method ends; otherwise, the first consumable MCU unit decrypts the ciphertext data of the verification algorithm in the storage unit and write the plaintext data of the verification algorithm into the algorithm code storage subunit, and continues to perform Steps S03-S06 until the end.

For example, assuming that the mark value of the first generation chip is 0, if the index byte value is equal to 0, the first consumable MCU unit sends the former verification password to the printer; if the index byte value is not equal to 0, the dual-core can be activated, and the second consumable MCU unit calculates a new verification password, and the first consumable MCU unit sends the new verification password to the printer. The mark value of the first-generation chip can be not limited to 0, and the mark value of the first-generation chip can be understood not only as the first-generation chip, but also as the general-purpose chip before the printer firmware is upgraded. The latter understands that the chips of earlier generations are generally eliminated and disused for many years without production, so that consumable chips do not need to record the data of earlier generation chips, such as the former verification password of earlier generation chips, such that the interaction efficiency between consumable chips and the printer communication system can be improved.

Wherein, the step that the first consumable MCU unit inquires that the second consumable MCU unit has completed the second consumable chip core processing flow can be specifically as follows: when the first consumable MCU unit inquires that the second consumable MCU unit has completed the completion mark of the second consumable chip core processing flow, confirming that the second MCU unit has completed the second consumable chip core processing flow.

In order to avoid query errors, the consumable chip communication method further includes the step: clearing a completion mark, added before Step S04.

Before the first consumable MCU unit activates the second consumable MCU unit to execute the second consumable chip core processing flow, the completion mark that the second consumable MCU unit has previously completed the second consumable chip core processing flow can be cleared. After the second consumable MCU unit is activated for use last time, the mark is non-zero, and it is cleared before activating again. After the second consumable MCU unit is activated and the second chip core processing flow is executed, the mark changes to non-zero. When the first consumable MCU unit detects that the mark is non-zero, it reads the new verification password from the data storage subunit, and then deactivates the second consumable MCU unit. The operation of deactivating the second consumable MCU unit actually switches the dual-core to a single-core, and the first consumable MCU unit can be the master during subsequent communication and interaction with the printer, which improves the communication efficiency.

Figure 5:
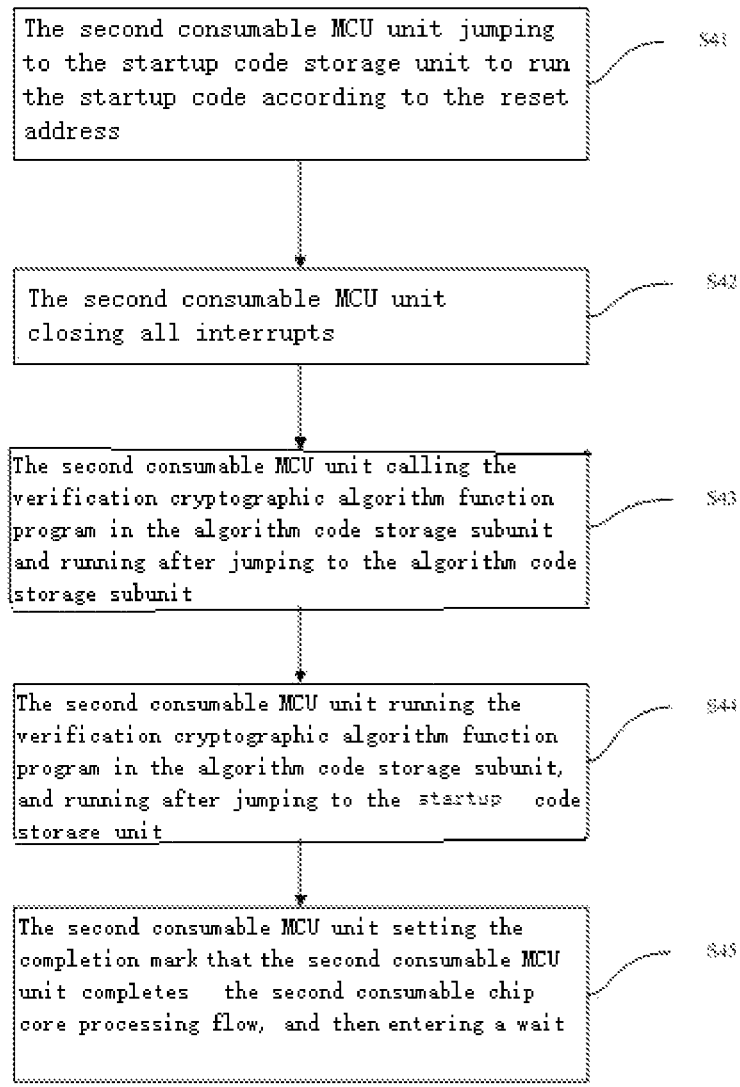
FIG. 5 is a flowchart of a second consumable MCU unit in FIG. 3.

As shown in FIG. 5, the step that the second consumable MCU unit executes the second consumable chip core processing flow is specifically as follows:

Step S41, the second consumable MCU unit jumping to the startup code storage unit to run the startup code according to the reset address;

Step S42, the second consumable MCU unit closing all interrupts; Step S43, the second consumable MCU unit calling the verification cryptographic algorithm function program in the algorithm code storage subunit and running after jumping to the algorithm code storage subunit;

Step S44, the second consumable MCU unit running the verification cryptographic algorithm function program in the algorithm code storage subunit, and running after jumping to the startup code storage unit;

Step S45, the second consumable MCU unit setting the completion mark for the second consumable MCU unit to complete the second consumable chip core processing flow, and then enters a wait.

Figure 7:
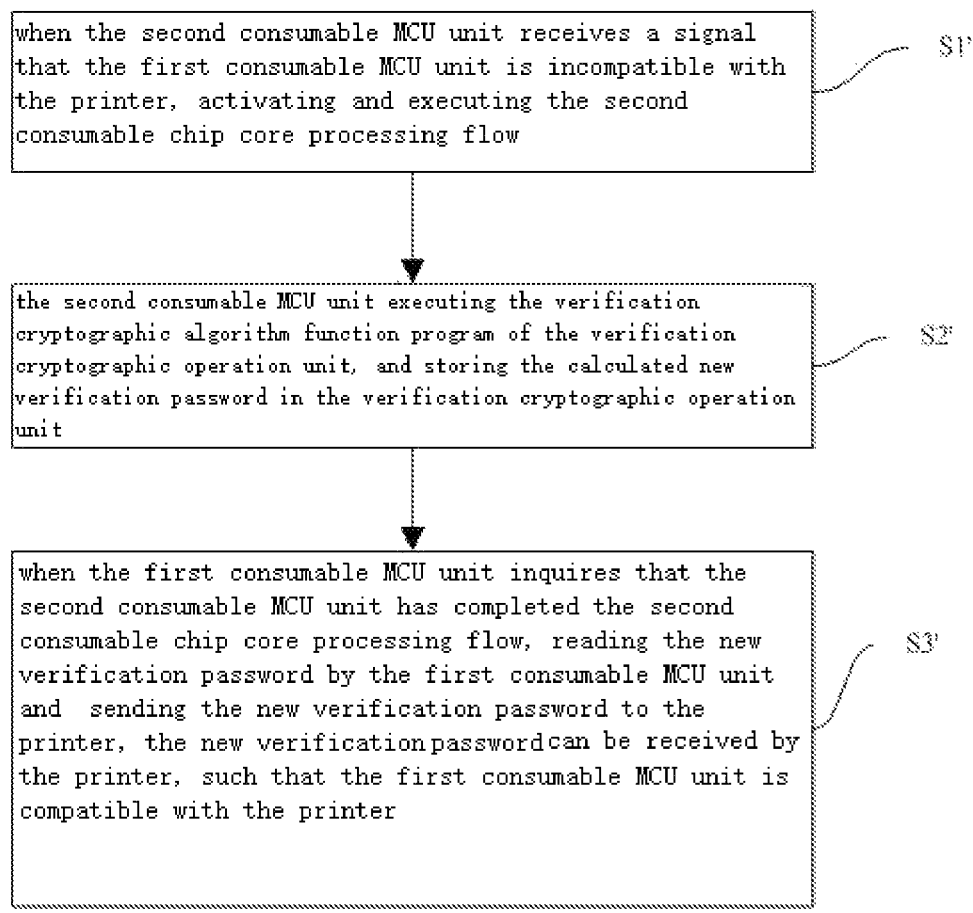
FIG. 7 is a flowchart of a consumable chip communication method applied to a second consumable MCU unit according to the present disclosure.

The present disclosure also proposes a consumable chip communication method, as shown in FIG. 7. The method can be used for a consumable chip including a first consumable MCU unit, a verification cryptographic operation unit, and a second consumable MCU unit; the method includes:

Step S1', when the second consumable MCU unit receives a signal that the first consumable MCU unit is incompatible with the printer, activating and executing the second consumable chip core processing flow;

Step S2', the second consumable MCU unit executing the verification cryptographic algorithm function program of the verification cryptographic operation unit, and storing the calculated new verification password in the verification cryptographic operation unit;

Step S3', when the first consumable MCU unit inquires that the second consumable MCU unit has completed the second consumable chip core processing flow, reading the new verification password by the first consumable MCU unit and sending the new verification password to the printer, the new verification password can be received by the printer, such that the first consumable MCU unit is compatible with the printer.

Wherein, the verification cryptographic operation unit includes an algorithm code storage subunit and a data storage subunit. The second consumable MCU unit executes the verification cryptographic algorithm function program of the verification cryptographic operation unit. The step of storing the calculated new verification password in the verification cryptographic operation unit can be specifically: the second consumable MCU unit executing the verification cryptographic algorithm function program of the algorithm code storage subunit according to the plaintext data of the verification algorithm, and storing the calculated new verification password in the data storage subunit.

In one embodiment, the second consumable MCU unit executes the startup program by default setting the startup code in the second consumable MCU unit, once the second consumable MCU unit receives the startup instruction sent by the first consumable MCU unit, then it automatically runs according to the startup code. In another embodiment, the startup code can be provided by the first consumable MCU unit. The consumable chip further includes a startup code storage unit and a storage unit; the method further includes: before the second consumable MCU unit is activated, copying the startup code of the storage unit to the startup code storage unit after the consumable chip is powered on; calling the startup code storage unit after the second consumable MCU unit is activated.

The steps of the second consumable MCU unit executing the second consumable chip core processing flow specifically refer to the steps shown in FIG. 5.

After the second consumable MCU unit is activated, it can always remain in the activated state, which will cause a great power loss. To this end, the method further includes: after the first consumable MCU unit inquires that the second consumable MCU unit has completed the second consumable chip core processing flow and reads the new verification password, the second consumable MCU unit receiving the deactivated instruction of the first consumable MCU unit, and being deactivated.

In order to avoid query errors, the method further includes: before the second consumable MCU unit is activated, clearing the completion mark of the second consumable MCU unit to previously complete the second consumable chip core processing flow.

Figure 8:
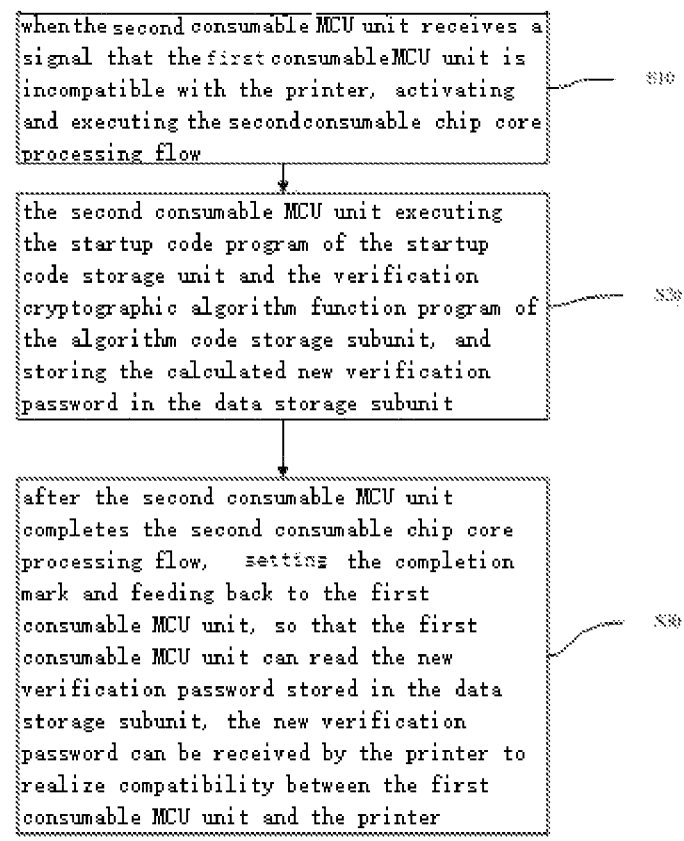
FIG. 8 is a flowchart according to an embodiment of a consumable chip communication method applied to a second consumable MCU unit according to the present disclosure.

FIG. 8 illustrates a specific implementation based on the example implementation of the consumable chip shown in FIG. 3. The method of the present disclosure includes:

Step S10, when the second consumable MCU unit receives a signal that the first consumable MCU unit is incompatible with the printer, activating and executing the second consumable chip core processing flow;

Step S20, the second consumable MCU unit executing the startup code program of the startup code storage unit and the verification cryptographic algorithm function program of the algorithm code storage subunit, and storing the calculated new verification password in the data storage subunit;

Step S30, after the second consumable MCU unit completes the second consumable chip core processing flow, clearing the completion mark and feeding back to the first consumable MCU unit, so that the first consumable MCU unit can read the new verification password stored in the data storage subunit, the new verification password can be received by the printer to realize compatibility between the first consumable MCU unit and the printer.

The signal that the first consumable MCU unit and the printer are not compatible in one embodiment, can be determined by determining whether the index byte corresponds to the mark value of the first-generation chip. If it corresponds, it is compatible, if it does not correspond, it is not compatible. In another embodiment, by searching the ciphertext data of the verification algorithm in the first consumable MCU unit, if the ciphertext data of the verification algorithm after the printer firmware upgrade is not searched, it is considered incompatible, and the ciphertext data of the verification algorithm stored in the second consumable MCU unit can be required to perform subsequent compatibility certification. In another embodiment, the first consumable MCU unit and the printer directly perform existing communication certification, and once the certification fails, it means they are incompatible. At this time, the second consumable MCU unit replaces the first consumable MCU unit for certification communication.

Those skilled in the art should understand that the above description and the embodiments of the present disclosure shown in the accompanying drawings are only examples and do not limit the present disclosure. The objects of the present disclosure have been fully and effectively realized. The functions and structural principles of the present disclosure have been shown and explained in the embodiments. Without departing from the principles, the implementation of the present disclosure can have any variants or modification.

The invention claimed is:

1. A consumable chip, wherein comprising a first consumable MCU unit, a second consumable MCU unit, and a verification cryptographic operation unit;
when the first consumable MCU unit is incompatible with a printer, the first consumable MCU unit activating the second consumable MCU unit to execute a second consumable chip core processing flow; the second consumable MCU unit executing a verification cryptographic algorithm function program of the verification cryptographic operation unit, and storing a calculated new verification password in the verification cryptographic operation unit;
after the first consumable MCU unit inquires that the second consumable MCU unit has completed the second consumable chip core processing flow, the first consumable MCU unit reading a new verification password of the verification cryptographic operation unit and sending to the printer; the new verification password being received by the printer to make the first consumable MCU unit compatible with the printer.

2. The consumable chip according to claim 1, wherein the verification cryptographic operation unit comprises:
an algorithm code storage subunit configured for storing a plaintext data of a verification algorithm after decryption;
a data storage subunit configured for storing the new verification password and a former verification password;
the second consumable MCU unit executes the verification cryptographic algorithm function program of the algorithm code storage subunit according to the plaintext data of the verification algorithm, and the calculated new verification password is stored in the data storage subunit.

3. The consumable chip according to claim 1, wherein further comprises: a storage unit for storing ciphertext data of the verification algorithm; after the first consumable MCU unit receives an index byte and a key, the first consumable MCU unit searches the ciphertext data of the verification algorithm through the index byte, and decrypts the ciphertext data of the verification algorithm according to the key and sends the plaintext data of the verification algorithm to the verification cryptographic operation unit; the second consumable MCU unit executes the verification cryptographic algorithm function program according to the plaintext data of the verification algorithm.

4. The consumable chip according to claim 1, wherein further comprises:
a startup code storage unit;
a storage unit for storing the startup code;
before the first consumable MCU unit activates the second consumable MCU unit, the startup code of the storage unit is copied to the startup code storage unit after the consumable chip is powered on.

5. The consumable chip according to claim 1, wherein the first consumable MCU unit comprises:
an execute subunit configured to interact with the printer; when the first consumable MCU unit is incompatible with the printer, the second consumable MCU unit is activated; and
a detect subunit configured to determine that the second consumable MCU unit has completed the second consumable chip core processing flow, when a completion mark of the second consumable chip core processing flow completed by the second consumable MCU unit is inquired;
after the detect subunit inquires that the second consumable MCU unit has completed the second consumable chip core processing flow, the execute subunit is also configured to read the new verification password of the verification cryptographic operation unit and deactivate the second consumable MCU unit, and then send the new verification password to the printer.

6. The consumable chip according to claim 5, wherein the first consumable MCU unit further comprises a mark clear subunit, configured, before the execute subunit activates the second consumable MCU unit, to clear the completion mark when the second consumable chip core processing flow is previously completed by a second consumable MCU unit.

7. The consumable chip according to claim 6, wherein further comprises:
a storage unit configured to store the ciphertext data of the verification algorithm, the startup code and the former verification password;
a startup code storage unit;
before the first consumable MCU unit activates the second consumable MCU unit, the startup code of the storage unit is copied by the first consumable MCU unit to the startup code storage unit after the consumable chip is powered on, and the first consumable MCU unit sends the former verification password to the verification cryptographic operation unit;
after an index byte and the key sent by the printer are received by the first consumable MCU unit, the first consumable MCU unit searches the ciphertext data of the verification algorithm through the index byte, and decrypts the ciphertext data of the verification algorithm according to the key, and sends the plaintext data of the verification algorithm to the verification cryptographic operation unit; the second consumable MCU unit executes the verification cryptographic algorithm function program according to the plaintext data of the verification algorithm.

8. The consumable chip according to claim 5, wherein the first consumable MCU unit further comprises a judge subunit, configured to determine whether the index byte corresponds to a mark value of a first-generation chip; and if so, the second consumable MCU unit is deactivated, the first consumable MCU unit is compatible with the printer;

otherwise, the execute subunit activates the second consumable MCU unit.

9. The consumable chip according to claim 8, wherein further comprises:

a storage unit configured to store the ciphertext data of the verification algorithm, the startup code and the former verification password;

a startup code storage unit;

before the first consumable MCU unit activates the second consumable MCU unit, the startup code of the storage unit is copied by the first consumable MCU unit to the startup code storage unit after the consumable chip is powered on, and the first consumable MCU unit sends the former verification password to the verification cryptographic operation unit;

after an index byte and the key sent by the printer are received by the first consumable MCU unit, the first consumable MCU unit searches the ciphertext data of the verification algorithm through the index byte, and decrypts the ciphertext data of the verification algorithm according to the key, and sends the plaintext data of the verification algorithm to the verification cryptographic operation unit; the second consumable MCU unit executes the verification cryptographic algorithm function program according to the plaintext data of the verification algorithm.

10. The consumable chip according to claim 5, wherein further comprises:

a storage unit configured to store the ciphertext data of the verification algorithm, the startup code and the former verification password;

a startup code storage unit;

before the first consumable MCU unit activates the second consumable MCU unit, the startup code of the storage unit is copied by the first consumable MCU unit to the startup code storage unit after the consumable chip is powered on, and the first consumable MCU unit sends the former verification password to the verification cryptographic operation unit;

after an index byte and the key sent by the printer are received by the first consumable MCU unit, the first consumable MCU unit searches the ciphertext data of the verification algorithm through the index byte, and decrypts the ciphertext data of the verification algorithm according to the key, and sends the plaintext data of the verification algorithm to the verification cryptographic operation unit; the second consumable MCU unit executes the verification cryptographic algorithm function program according to the plaintext data of the verification algorithm.

11. The consumable chip according to claim 1, wherein further comprises:

a storage unit configured to store the ciphertext data of the verification algorithm, the startup code and the former verification password;

a startup code storage unit;

before the first consumable MCU unit activates the second consumable MCU unit, the startup code of the storage unit is copied by the first consumable MCU unit to the startup code storage unit after the consumable chip is powered on, and the first consumable MCU unit sends the former verification password to the verification cryptographic operation unit;

after an index byte and the key sent by the printer are received by the first consumable MCU unit, the first consumable MCU unit searches the ciphertext data of the verification algorithm through the index byte, and decrypts the ciphertext data of the verification algorithm according to the key, and sends the plaintext data of the verification algorithm to the verification cryptographic operation unit; the second consumable MCU unit executes the verification cryptographic algorithm function program according to the plaintext data of the verification algorithm.

12. A communication method for a consumable chip, wherein being used for a consumable chip comprising a first consumable MCU unit, a verification cryptographic operation unit and a second consumable MCU unit; the method comprises:

activating, by the first consumable MCU unit, the second consumable MCU unit to execute a second consumable chip core processing flow, when the first consumable MCU unit is incompatible with a printer; and calling the verification cryptographic algorithm function program of the verification cryptographic operation unit to calculate a new verification password;

reading, by the first consumable MCU unit, the new verification password of the verification cryptographic operation unit, and sending to the printer, after the first consumable MCU unit inquires that the second consumable MCU unit has completed the second consumable chip core processing flow; the new verification password is received by the printer to make the first consumable MCU unit compatible with the printer.

13. The communication method according to claim 12, wherein the consumable chip further comprises a storage unit; the method further comprises:

searching, by the first consumable MCU unit, the ciphertext data of the verification algorithm in the storage unit through an index byte after the first consumable MCU unit receives the index byte and a key sent by the printer, before the first consumable MCU unit activates the second consumable MCU unit, and decrypting the ciphertext data of the verification algorithm according to the key and sending the plaintext data of the verification algorithm to the verification cryptographic operation unit;

executing, by the second consumable MCU unit, the verification cryptographic algorithm function program of the verification cryptographic operation unit according to the plaintext data of the verification algorithm, and calculating a new verification password.

14. The communication method according to claim 13, wherein the method further comprises:

determining, by the first consumable MCU unit, whether the index byte is corresponding to a mark value of a first-generation chip before the ciphertext data of the verification algorithm is searched by the index byte;

if so, the second consumable MCU unit being not activated, and the first consumable MCU unit being compatible with the printer;

otherwise, the second consumable MCU unit being activated.

15. The communication method according to claim 12, wherein the consumable chip further comprises a startup code storage unit and a storage unit; and the method further comprises:

copying, by the first consumable MCU unit, the startup code of the storage unit to the startup code storage unit after the consumable chip is powered on, before the first consumable MCU unit activates the second consumable MCU unit;

calling the startup code storage unit after the second consumable MCU unit is activated.

16. The communication method according to claim 12, wherein the method further comprises:

determining that the second consumable MCU unit has completed the second consumable chip core processing flow, when the first consumable MCU unit inquires a completion mark that the second consumable MCU unit has completed the second consumable chip core processing flow, and deactivating, by the first consumable MCU unit, the second consumable MCU unit after the new verification password is read.

17. The communication method according to claim 16, wherein the method further comprises:

clearing the completion mark that a second consumable MCU unit previously completes the second consumable chip core processing flow, before the first consumable MCU unit activates the second consumable MCU unit.

18. The communication method according to claim 16, wherein the steps of the second consumable MCU unit executing the second consumable chip core processing flow are specifically:

the second consumable MCU unit jumping to the startup code storage unit to run the startup code according to a reset address;

the second consumable MCU unit closing all interrupts;

the second consumable MCU unit calling the verification cryptographic algorithm function program in the algorithm code storage subunit, and running after jumping to the algorithm code storage subunit;

the second consumable MCU unit running the verification cryptographic algorithm function program in the algorithm code storage subunit, and running after jumping to startup code storage unit;

the second consumable MCU unit setting the completion mark that the second consumable MCU unit completes the second consumable chip core processing flow, and then entering a wait.

19. The communication method according to claim 16, wherein the consumable chip further comprises a storage unit and a startup code storage unit; the method further comprises:

copying, by the first consumable MCU unit, the startup code of the storage unit to the startup code storage unit after the consumable chip is powered on, before the first consumable MCU unit activates the second consumable MCU unit, and sending the former verification password of the storage unit to the verification cryptographic operation unit;

searching, by the first consumable MCU unit, the ciphertext data of the verification algorithm through the index byte, and decrypting the ciphertext data of the verification algorithm according to the key and sending the plaintext data of the verification algorithm to the verification cryptographic operation unit, after receiving the index byte and the key sent by the printer;

executing, by the second consumable MCU unit, the verification cryptographic algorithm function program of the verification cryptographic operation unit according to the plaintext data of the verification algorithm, and calculating a new verification password.

20. The communication method according to claim 12, wherein the consumable chip further comprises a storage unit and a startup code storage unit; the method further comprises:

copying, by the first consumable MCU unit, the startup code of the storage unit to the startup code storage unit after the consumable chip is powered on, before the first consumable MCU unit activates the second consumable MCU unit, and sending the former verification password of the storage unit to the verification cryptographic operation unit;

searching, by the first consumable MCU unit, the ciphertext data of the verification algorithm through the index byte, and decrypting the ciphertext data of the verification algorithm according to the key and sending the plaintext data of the verification algorithm to the verification cryptographic operation unit, after receiving the index byte and the key sent by the printer;

executing, by the second consumable MCU unit, the verification cryptographic algorithm function program of the verification cryptographic operation unit according to the plaintext data of the verification algorithm, and calculating a new verification password.

* * * * *